Nov. 19, 1957   E. H. SWANSON   2,814,012
D. C. MOTOR CONTROL SYSTEMS
Filed June 21, 1956
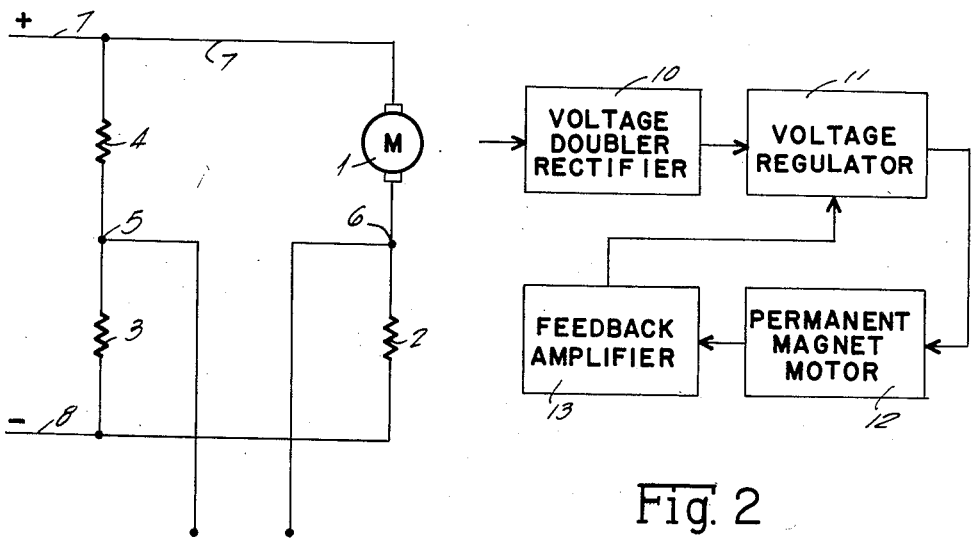
Fig. 1
Fig. 2
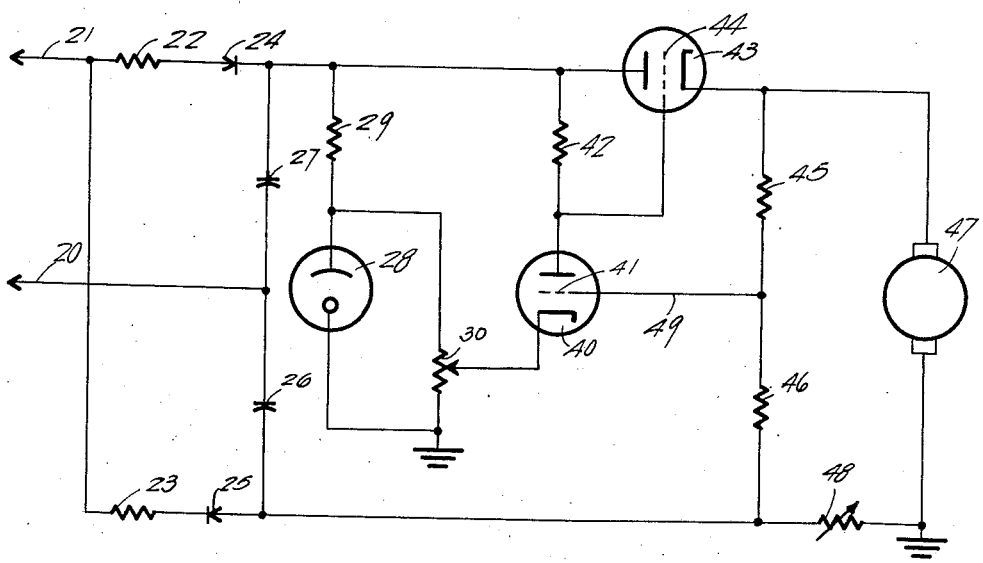
Fig. 3
INVENTOR.
ELSTON HUBERT SWANSON
BY
ATTORNEYS

United States Patent Office 2,814,012
Patented Nov. 19, 1957

2,814,012

D. C. MOTOR CONTROL SYSTEMS

Elston H. Swanson, Glen Head, N. Y., assignor, by mesne assignments, to the United States of America as represented by the Secretary of the Navy Application June 21, 1956, Serial No. 593,002

2 Claims. (Cl. 318—331)

This invention relates to speed control of D.-C. type motors. In prior conventional type of control systems, a reference generator is directly coupled to the motor to be controlled; changes in the electrical output of the reference generator are an indication of the changes in the speed of the controlled motor.

An object of this invention is an electric control system which eliminates the use of the above-mentioned reference generator.

A further object of this invention is a control system which permits uniform rotational velocities of the controlled motor at much lower speeds than previously possible.

A still further object of this invention is a device which provides for automatic compensation of changes which affect the speed of the motor.

A still further object of this invention is a motor control system which provides a large value of torque at low speeds of the motor.

These and other objects will be readily apparent to those skilled in the art from an examination of the following specification and enclosed drawings wherein:

Figure 1 is a schematic diagram of the basic theory of the instant control system, Figure 2 is a block diagram of the control system, and Figure 3 is a schematic diagram of an instant application of the block diagram of Figure 2.

In any D.-C. motor, the speed may be stabilized by supplying a signal to a feedback system such that a minute change in the speed produces an error signal that alters the voltage applied to the motor armature sufficiently to correct for the speed change. This invention utilizes the counter E. M. F. of the motor as an error signal source, which signal is proportional to motor speed.

In any D.-C. shunt motor the following equations apply if the effects of armature reaction are neglected and the field flux is considered constant:

(1) $\quad E_c = E_t - I_a R_a = KS$
(2) $\quad T = K' I_a$ where $E_c$ = counter E. M. F.
$E_t$ = terminal voltage applied to the motor
$I_a$ = armature current
$R_a$ = armature resistance
$S$ = motor speed
$T$ = motor torque
$K'$ and $K$ = constants By well known formulas, $E_c$ is proportional to $S$. To obtain a feedback voltage proportional to $E_c$, a simple resistive network can be drawn up as shown in Figure 1. The motor 1 in series with a resistor 2 is joined in parallel with series resistors 3, 4. Since the resistance of the armature is $R_a$, the resistance of element 2 is made $R_a/n$ where $n$ is any arbitrary design factor; such a design is equivalent to making the resistance of the motor $nR_a$. In parallel with these two elements, a pair of resistances of the values of R and $n$R are inserted in series with each other.

With such an arrangement, the circuit becomes a simple bridge circuit; if taps are made at 5 and 6, the voltage across the taps is equal to the changes in the feedback voltage $E_f$.

The feedback voltage, on the other hand, can be expressed as follows:

$$E_f = \left[\frac{R}{(n+1)R}\left(E_t + \frac{I_a R_a}{n}\right)\right] - \frac{I_a R_a}{n}$$

Which by combining terms, may be resolved to $$E_f = \frac{1}{n+1}(E_t - I_a R_a)$$

or $$E_f = \frac{E_c}{n+1}$$

The feedback voltage $E_f$ is therefore proportional to the counter E. M. F. and is therefore proportional to the motor speed.

Extending this basic diagram of Figure 1 to a block diagram of Figure 2 with any standard 110 v., 60 C. P. S. source, such voltage first enters a voltage doubler and rectifier; the output of which is regulated by a voltage regulator 11; and then enters the permanent magnet motor 12. The feedback voltage from the motor after being amplified by amplifier 13 feeds a return signal into the regulator 11 which in turn modifies the input to the motor 12.

Referring to Figure 3, a specific application of the block diagram of Figure 2 is illustrated. Leads 20, 21 supply the conventional 110 v., 60 C. P. S. supply into a voltage doubler and rectifier network consisting of the resistors 22, 23, diodes 24, 25 and capacitors 26, 27. The voltage of the doubler-rectifier circuit is kept constant by the voltage regulator tube 28 connected to the output of the doubler-rectifier circuit via limiting resistor 29. A potentiometer in parallel with regulator tube 28 controls the value of the regulated output.

In series with the rectified regulated output is a triode 43 and a bridge circuit of Figure 1 consisting of the resistors 45, 46 in one branch and the motor to be controlled 47 and a variable resistor 48 in the other parallel branch. Having the resistor 48 and the motor 47 connected to ground and the resistors 45, 46 connected to a common lead 49 makes the voltage in lead 49 equal to the changes of the feedback voltage $ef$.

Lead 49 is accordingly connected to the amplifier circuit consisting of the triode 40 and resistor 42. Grid 44 is connected to the amplifier circuit thus making tube 43 responsive to the changes in $ef$ or lead 49.

One leg of the potentiometer 30 is connected to the cathode of the amplifier tube 40 thus making the current through the amplifier section proportional to the regulated voltage.

In the operation of the control circuit and with reference to the formulas previously recited, a decrease in speed decreases $E_c$ ($E_c = KS$), which in turn decreases the potential of lead 49 and grid 41; consequently, grid 44 becomes more positive thereby increasing the line voltage to the motor and stabilizing the speed.

In a similar manner, any increase in torque increases the armature current ($T = KI_a$) which in turn decreases the counter E. M. F. ($E_c$) and decreases the feedback voltage [$E_c = E_f(n+1)$]. A decreased $E_f$ makes grid 41 more negative thereby having grid 44 more positive, increasing the supply voltage and stabilizing the speed.

Other changes, such as line voltage, can be traced through the circuit with the use of the above formulas in a similar way.

Changes in the line voltage can also be regulated by the potentiometer 30; while changes in the resistive values of the bridge circuit may be compensated for by the variable resistor 48.

Obviously many modifications and variations of the present invention are possible in the light of the above teachings. It is therefore to be understood that within the scope of the appended claims the invention may be practiced otherwise than as specifically described.

What is claimed is:

1. Apparatus for controlling the speed of a D.-C. motor said apparatus comprising a regulated D.-C. supply source; a variable resistor; a first electron tube having a plate, a cathode, and a control grid; a circuit connected across the supply source, said circuit including in series the variable resistor, the D.-C. motor, and the plate cathode circuit of the first tube; a pair of resistors connected in parallel with the series connected D.-C. motor and variable resistor; another resistor; a second electron tube having a plate, a cathode and a control grid; a circuit across the supply source including in series the said other resistor and the plate cathode circuit of the second tube; means connecting the junction of the said pair of resistors to the control grid of the second tube; and means connecting the control grid of the first tube to the plate of the second tube.

2. Apparatus for controlling the speed of a D.-C. motor said apparatus comprising an A.-C. supply source; means connected across the supply source for rectifying and doubling the voltage developed by the supply source; a voltage regulator means connected across the output circuit of the rectifying and doubling means; a variable resistor; a first electron tube having a plate, a cathode, and a control grid; a circuit connected across the voltage regulator means, said circuit including in series the variable resistor, the D.-C. motor, and the plate cathode circuit of the first tube; a pair of resistors connected in parallel with the series connected D.-C. motor and variable resistor; another resistor; a second electron tube having a plate, a cathode and a control grid; a circuit across the voltage regulator means including in series the said other resistor and the plate cathode circuit of the second tube; means connecting the junction of the said pair of resistors to the control grid of the second tube; and means connecting the control grid of the first tube to the plate of the second tube.

References Cited in the file of this patent

UNITED STATES PATENTS

| 2,389,367 | King | Nov. 20, 1945 |
| 2,558,086 | Herchenroeder | June 26, 1951 |

FOREIGN PATENTS

| 580,005 | Great Britain | Aug. 23, 1946 |
| 834,711 | Germany | Mar. 24, 1952 |
| 1,054,387 | France | Oct. 7, 1953 |